(12) United States Patent
Lynch et al.

(10) Patent No.: US 11,162,639 B2
(45) Date of Patent: Nov. 2, 2021

(54) PRESSURE VESSELS AND METHOD OF FABRICATION

(71) Applicant: HYDROGEN COMPONENTS, INC., Bailey, CO (US)

(72) Inventors: Franklin Earl Lynch, Bailey, CO (US); Gary Everett Eastridge, Bailey, CO (US)

(73) Assignee: HYDROGEN COMPONENTS, INC., Bailey, CO (US)

( * ) Notice: Subject to any disclaimer, the term of this patent is extended or adjusted under 35 U.S.C. 154(b) by 0 days.

(21) Appl. No.: 16/819,055

(22) Filed: Mar. 14, 2020

(65) Prior Publication Data

US 2020/0318789 A1 Oct. 8, 2020

Related U.S. Application Data

(60) Provisional application No. 62/830,700, filed on Apr. 8, 2019.

(51) Int. Cl.
*F17C 1/02* (2006.01)
*F17C 1/08* (2006.01)
*F17C 1/06* (2006.01)

(52) U.S. Cl.
CPC ............. *F17C 1/08* (2013.01); *F17C 1/02* (2013.01); *F17C 1/06* (2013.01);
(Continued)

(58) Field of Classification Search
CPC .... F17C 1/06; F17C 1/08; F17C 1/102; F17C 2203/013; F17C 2201/0157;
(Continued)

(56) References Cited

U.S. PATENT DOCUMENTS

| 5,462,193 A | 10/1995 | Schoo |
| RE39,554 E * | 4/2007 | Steele .................. B29C 70/543 264/512 |

(Continued)

FOREIGN PATENT DOCUMENTS

| DE | 19749950 A1 * | 5/1999 | |
| FR | 2813378 A1 * | 3/2002 | |
| WO | WO-2015160324 A1 * | 10/2015 | .............. F28F 3/086 |

OTHER PUBLICATIONS

Translation of Heurtaux.*
(Continued)

*Primary Examiner* — John F Pettitt, III
(74) *Attorney, Agent, or Firm* — Stephen A. Gratton

(57) ABSTRACT

A pressure vessel includes curved sidewalls configured as a frame having a polygonal outline, a planar top side and a planar bottom side attached to the curved sidewalls forming a sealed pressure chamber therebetween. Each planar side includes a contoured surface having shaped pressure resistant features formed thereon. A preferred method for forming the pressure resistant features includes hydraulic pressurization to induce plastic strain. The pressure vessel also includes an array of internal support posts within the sealed pressure chamber attached to the planar sides in a geometrical pattern, such as a hexagonal array. The support posts can be solid metal cylinders, hollow tubes or tubes through which reinforcing materials, such as carbon fiber, glass fiber, or fiber/epoxy tape have been passed. A composite pressure vessel includes tubular internal support posts reinforced with reinforcing materials, as well as contoured surfaces and curved sidewalls reinforced with these same reinforcing materials.

6 Claims, 15 Drawing Sheets

(52) U.S. Cl.
CPC *F17C 2201/0157* (2013.01); *F17C 2203/013* (2013.01); *F17C 2203/0609* (2013.01); *F17C 2209/219* (2013.01); *F17C 2209/221* (2013.01); *F17C 2209/232* (2013.01)

(58) Field of Classification Search
CPC ............ F17C 2209/22; F17C 2209/221; F17C 2201/0147; F17C 2260/011; F17C 2203/0636; F17C 2203/01; F17C 2203/011; F17C 2203/012; B65D 7/44; B65D 7/48
USPC ........................................................ 220/653
See application file for complete search history.

(56) References Cited

U.S. PATENT DOCUMENTS

| | | | | |
|---|---|---|---|---|
| 2005/0011891 | A1* | 1/2005 | Austerhoff | B60K 15/03006 220/4.12 |
| 2014/0042173 | A1* | 2/2014 | Horstman | F17C 1/08 220/581 |
| 2017/0030519 | A1* | 2/2017 | Kuczek | F28F 3/086 |

OTHER PUBLICATIONS

Translation of KainzBauer.*
HCI Report to NASA Dated 1991, Final Report NAS10-11401, Submitted to National Aeronautics and Space Administration, John F. Kennedy Space Center, Kennedy Space Center, Florida, (Figure 3-2) 1 page, Mar. 1991.

* cited by examiner

PRESSURE VESSELS AND METHOD OF FABRICATION

CROSS REFERENCE TO RELATED APPLICATION

This application claims priority from U.S. Provisional No. 62/830,700, filed Apr. 8, 2019, which is incorporated herein by reference.

FIELD

This disclosure relates to pressure vessels and to methods for fabricating pressure vessels.

BACKGROUND

Conventional pressure vessels have cylindrical or spherical shapes because radiused surfaces effectively resist internal pressure forces. FIG. 1A illustrates a prior art cylindrical pressure vessel 10C. FIG. 1B illustrates a prior art spherical pressure vessel 10S. One problem with these shapes is that rectilinear "box" space is not filled efficiently by cylinders or spheres. As shown in FIG. 1A, the cylindrical pressure vessel 10C has a box space 12C. As shown in FIG. 1B, the spherical pressure vessel 10S (FIG. 1B) has a box space 12S. A cylinder fills 79% ($\pi/4$) and a sphere 52% ($\pi/6$) of rectilinear boxes around them, calculated as follows: (Cylinder Volume=$\pi R^2 L$, Box Volume=$4R^2 L$, Volume Used=$\pi/4$=79%) (Sphere Volume=$4/3 \pi R^3$, Box Volume=$8R^3$, Volume Used=$\pi/6$=52%).

Space inside vehicles is measured in rectilinear units, (e.g., cubic meters). However, as demonstrated above rectilinear "box" space is not filled efficiently by cylinders or spheres. Prior art attempts to fabricate box shaped pressure vessels have not been effective because truly flat surfaces, such as rectangular boxes, cannot resist pressure without bowing.

The present disclosure is directed to pressure vessels having planar surfaces and polygonal outlines that efficiently fill available spaces in volume-limited systems, such as motor vehicles or personal breathing systems (scuba, medical oxygen, etc.). In addition, the pressure vessels have an internal construction configured to resist pressure without deformation.

SUMMARY

A pressure vessel includes curved sidewalls configured as a frame having a polygonal outline, and opposing planar sides including a planar top side and a planar bottom side attached to the curved sidewalls forming a sealed pressure chamber therebetween. Each planar side includes a contoured surface having shaped pressure resistant features formed thereon. Exemplary pressure resistant features include dome features and saddle features formed in the contoured surfaces with complex transitions therebetween. In addition, the pressure resistant features are formed with small radius contours to resist pressure forces in the sealed pressure chamber, while minimally affecting the substantially planar characteristics of the planar sides of the pressure vessel. A preferred method for forming the pressure resistant features can include hydraulic pressurization by applying a pressure to the sealed pressure chamber that is much higher than an intended service pressure of the pressure vessel to induce plastic strain.

The pressure vessel also includes an array of internal support posts within the sealed pressure chamber attached to the planar sides in a geometrical pattern, such as a hexagonal array. The support posts can be solid metal cylinders, hollow tubes or tubes through which reinforcing fibers, such as carbon fibers, glass fibers, or fiber/epoxy tape have been passed. The support posts provide structural rigidity and compressive strength for the pressure vessel and prevent bowing of the planar sides. With the support posts arranged in a hexagonal array, the weight and volume needed to resist any given internal pressure in the sealed pressure chamber can be minimized. The pressure vessel can also include welded or brazed joints between the internal support posts and the planar sides configured to resist shear stresses and prevent leakage or permeation of gases from the sealed pressure chamber.

An exemplary material for the pressure vessel comprises a weldable or brazable metal, such as stainless steel, aluminum or a high temperature metal alloy, such as a titanium or nickel alloy. The pressure vessel can be configured to contain a variety of fluids and gases including hydrogen and hydrogen compounds.

The pressure vessel can be used as a metal liner for a composite pressure vessel constructed of composite materials for increased strength. A composite pressure vessel can include tubular internal support posts reinforced with reinforcing materials, such as carbon fibers, glass fibers, fiber/epoxy tape and cured fiber/epoxy materials. The composite pressure vessel can also include contoured surfaces and curved sidewalls reinforced with these same materials.

A method for fabricating a pressure vessel includes the steps of: forming a frame having curved sidewalls in a polygonal outline, forming opposing planar sides, forming an array of internal support posts attached to the planar sides in a selected geometrical pattern; attaching the planar sides to the frame to form a sealed pressure chamber by forming a plurality of welded or brazed joints between the internal support posts and the planar sides configured to resist shear stresses and prevent leakage or permeation of gases from the sealed pressure chamber; and forming contoured surfaces with integral shaped pressure resistant features on the planar sides. A preferred method of forming the shaped pressure resistant features on the planar sides comprises in situ hydraulic pressurization of the pressure vessel by applying a forming pressure that is much higher than the intended working pressure of the pressure vessel.

A method of fabricating a composite pressure vessel can include the step of providing the pressure vessel using the previous steps, except for the forming of the shaped pressure resistant features. Reinforcing materials, such as carbon fibers, glass fibers and/or fiber/epoxy tape can then be loosely applied over selected surfaces of the pressure vessel and through tubular internal support posts, leaving a predetermined amount of slack to accommodate growth during hydraulic pressurization. The internal pressure vessel can then be hydraulically inflated to form the contoured surfaces and apply tension to the reinforcing materials. The amount of slack and the hydraulic pressure level can be adjusted to induce prestress or "autofrettage". Curing of the resins in the reinforcing materials follows the forming/tensioning step. The pressure vessel can also be provided with a polygonal outline that facilitates applying of the reinforcing materials. For example, corners of the polygonal outline of the pressure vessel can be parallel to a row of internal support posts of the hexagonal array.

DETAILED DESCRIPTION

Figure 1A:
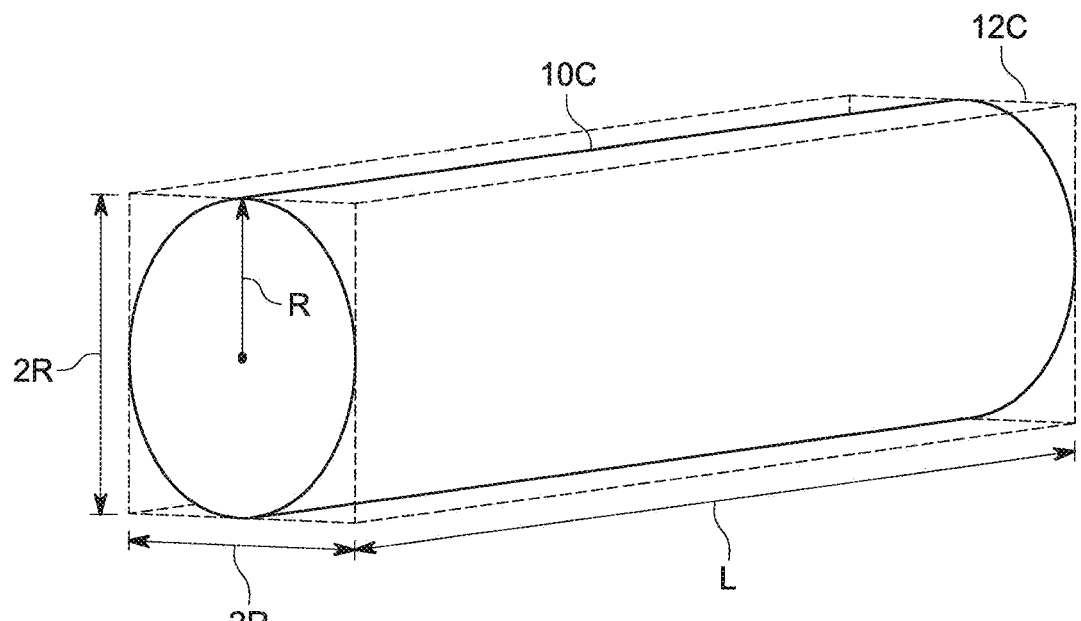
FIG. 1A is a perspective drawing of a prior art cylindrical pressure vessel illustrating its box space.
Figure 1B:
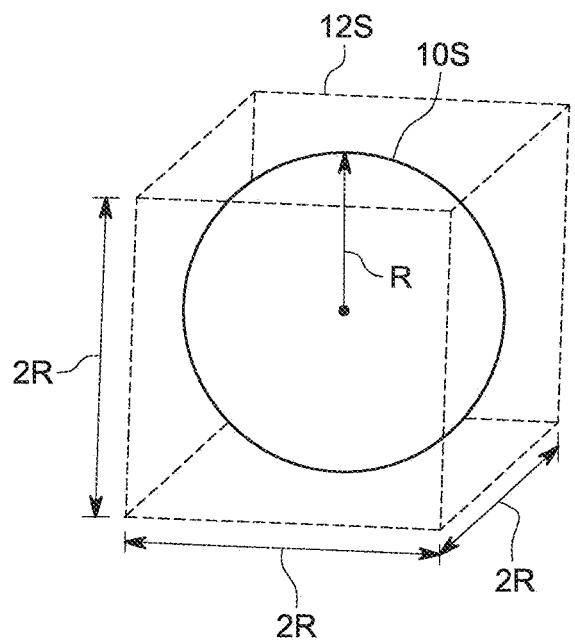
FIG. 1B is a perspective drawing of a prior art spherical pressure vessel illustrating its box space.
Figure 2:
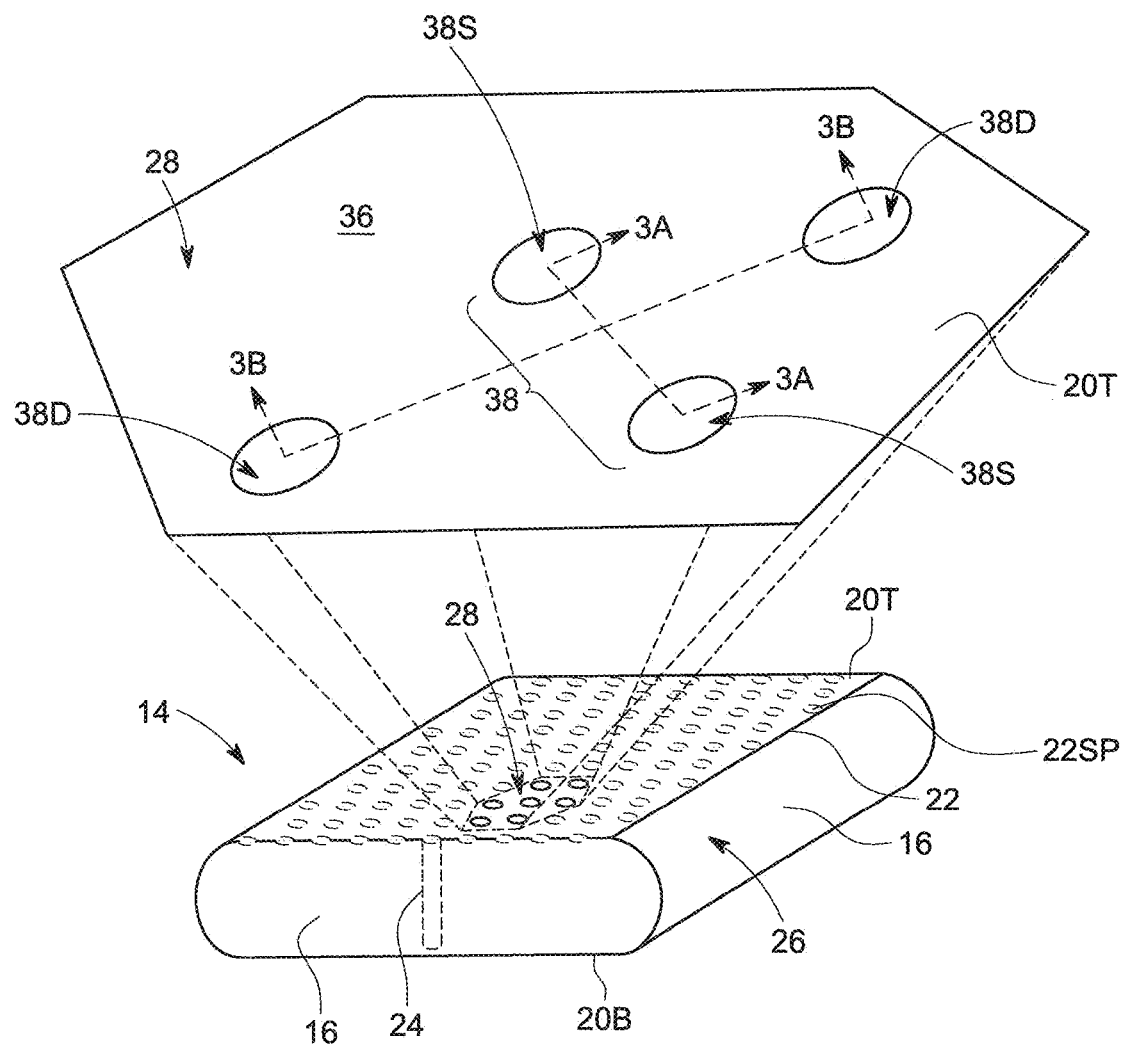
FIG. 2 is a perspective drawing of a pressure vessel having curved sidewalls, opposing planar sides and internal support posts illustrating an enlarged portion of a planar side.

Referring to FIG. 2, a pressure vessel 14 includes four curved metal sidewalls 16 configured as a frame 18 (FIG. 5A) having a polygonal outline. The pressure vessel 14 has an exterior outline that matches the polygonal outline of the frame 18. As used herein, the term polygonal outline means a closed shape with three or more straight sides. In the illustrative embodiment the polygonal outline comprises a square. Other, exemplary polygonal outlines include rectangle, triangle, hexagon, and octagon. As also shown in FIG. 2, the curved metal sidewalls 16 can have a half pipe shape. Other exemplary shapes can include quarter pipe shape and three quarter pipe shape.

The pressure vessel 14 also includes two opposing planar sides in the form of a planar top side 20T and a planar bottom side 20B. The planar top side 20T and the planar bottom side 20B are parallel to one another and are attached to the curved sidewalls 16 by continuous welded or brazed joints 22. The curved sidewalls 16 and the planar sides 20T, 20B form a sealed pressure chamber 26. The pressure vessel 14 also includes an array of internal support posts 24 within the sealed pressure chamber 26 attached to the planar sides 20T, 20B in a selected geometrical pattern using welded or brazed joints 22SP. The welded or brazed joints 22SP are designed to resist shear stresses and prevent leakage or permeation of gases out of the pressure vessel 14. In the illustrative embodiment, the internal support posts 24 are welded or brazed to internal surfaces of the planar sides 20T, 20B in hexagonal arrays 28, with each internal support post 24 perpendicular to the planar sides 20T, 20B. With this arrangement, the planar top side 20T and the planar bottom side 20B are parallel to one another. However in other embodiments, planar sides can be oriented at different angles with respect to one another (e.g., 90 degrees). In addition, although only two planar sides 20T, 20B are illustrated, there can be more, but only in opposing pairs of sides with internal support posts 24 between them.

In FIG. 2, for illustrative purposes, the area occupied by a single hexagonal array 28 has been enlarged and separated from the pressure vessel 14. The hexagonal array 28 is shown in more detail in FIG. 4. The internal support posts 24 can be placed in the hexagonal array 28 to minimize their displacement of pressure vessel internal volume and also their mass. In addition, the radial symmetry of the hexagonal array 28 minimizes the radii of the saddle features 38S and the dome features 38D on the planar sides 20T, 20B. As will be further explained, radial symmetry also gives an optimal arrangement for reinforcing fibers in a composite version of the pressure vessel 14. The internal support posts 24 also provide significant compressive strength for the pressure vessel 14. This simplifies handling during manufacture of the pressure vessel 14 and resists stresses from vehicle mounting brackets or accidental impact during use of the pressure vessel 14.

Figure 3A:
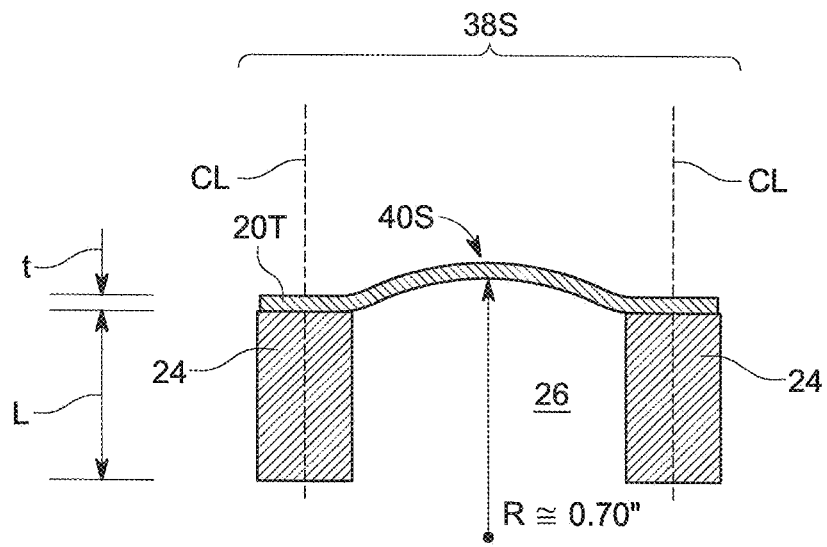
FIG. 3A is an enlarged cross sectional view taken along section line 3A-3A of FIG. 2 illustrating a shaped pressure resistant feature.
Figure 3B:
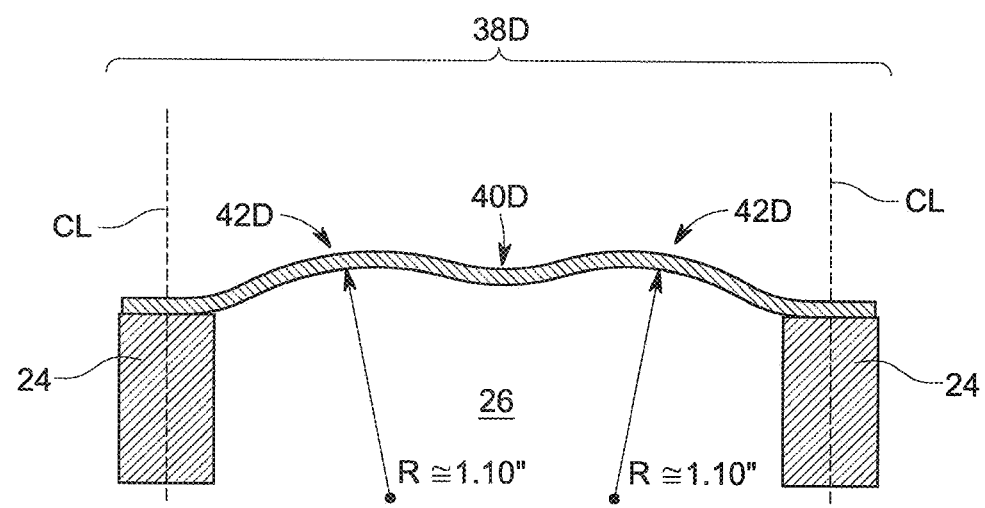
FIG. 3B is an enlarged cross sectional view taken along section line 3B-3B of FIG. 2 illustrating shaped pressure resistant features.

As shown in FIG. 2, the planar top side 20T includes a contoured surface 36 having a pattern of shaped pressure resistant features 38. In the illustrative embodiment the pressure resistant features 38 include saddle features 38S (FIG. 3A) and dome features 38D (FIG. 3B). As shown in FIG. 3A, the saddle features 38S bow outwardly from the planar top side 20T and from the sealed pressure chamber 26 with a radius of R and a generally convex shape when viewed from the sealed pressure chamber 26. As shown in FIG. 3B, the dome features 38D each include two domes 42D that bow outwardly from the planar top side 20T and from the sealed pressure chamber 26 with a radius of R and a saddle point 40D. A symmetrical way to look at each dome 42D is as surrounded by three saddle points 40D and three internal support posts 24. The sectional view in FIG. 3B coincidentally shows two domes 42D at 90 degrees from a saddle point 40D, such that the contoured surface 36 comprises a hexagonal array of individual domes 42D (FIG. 3B).

Referring to FIG. 3A, an exemplary geometry for the saddle features 38S is illustrated. In this example, the internal support posts 24 comprise solid or hollow metal cylinders having a diameter D of 0.25", a center line CL spacing S of 1" and a variable length L. In addition, the planar top side 20T has a thickness t of 0.035". Further, the saddle point 40S has a radius R of 0.70" with a maximum height on the planar top side 20T located midway between the internal support posts 24. The planar bottom side 20B (FIG. 2) can have the same saddle features 38S with the same geometry.

Referring to FIG. 3B, an exemplary geometry for the dome features 38D is illustrated. In this example, the internal support posts 24 comprise solid or hollow metal cylinders having a diameter D of 0.25", a center line CL spacing S of 1" and a variable length L. In addition, the planar top side 20T has a thickness t of 0.035". Further, two equally spaced domes 42D having a radius R of 1.10" and a saddle point 40D midway between the internal support posts 24 are formed.

In FIGS. 3A and 3B, the planar top side 20T and the contoured surface 36 can be formed using plastic strain by applying a pressure much higher than the intended service pressure. For example, the planar top side 20T can be hydraulically formed at 2000 psi during the manufacture of a pressure vessel intended for 1 k psi service. Relaxation after plastically forming the desired shape induces autofrettage. This improves durability and crack resistance of the pressure vessel 14.

Example. A primary objective of this exemplary design is to reduce hoop stress in the planar top side 20T (FIG. 2) and the planar bottom side 20B (FIG. 2) by shortening the radii of curvature. Hoop stress is a useful approximation for analysis of thin-walled pressure vessels. Wikipedia.org (ref) defines hoop stress, σ, as follows: $\sigma_{sphere}$=PR/2t, $\sigma_{cylinder}$=PR/t where: P is the internal pressure, t is the wall thickness and R is the radius.

Figure 4:
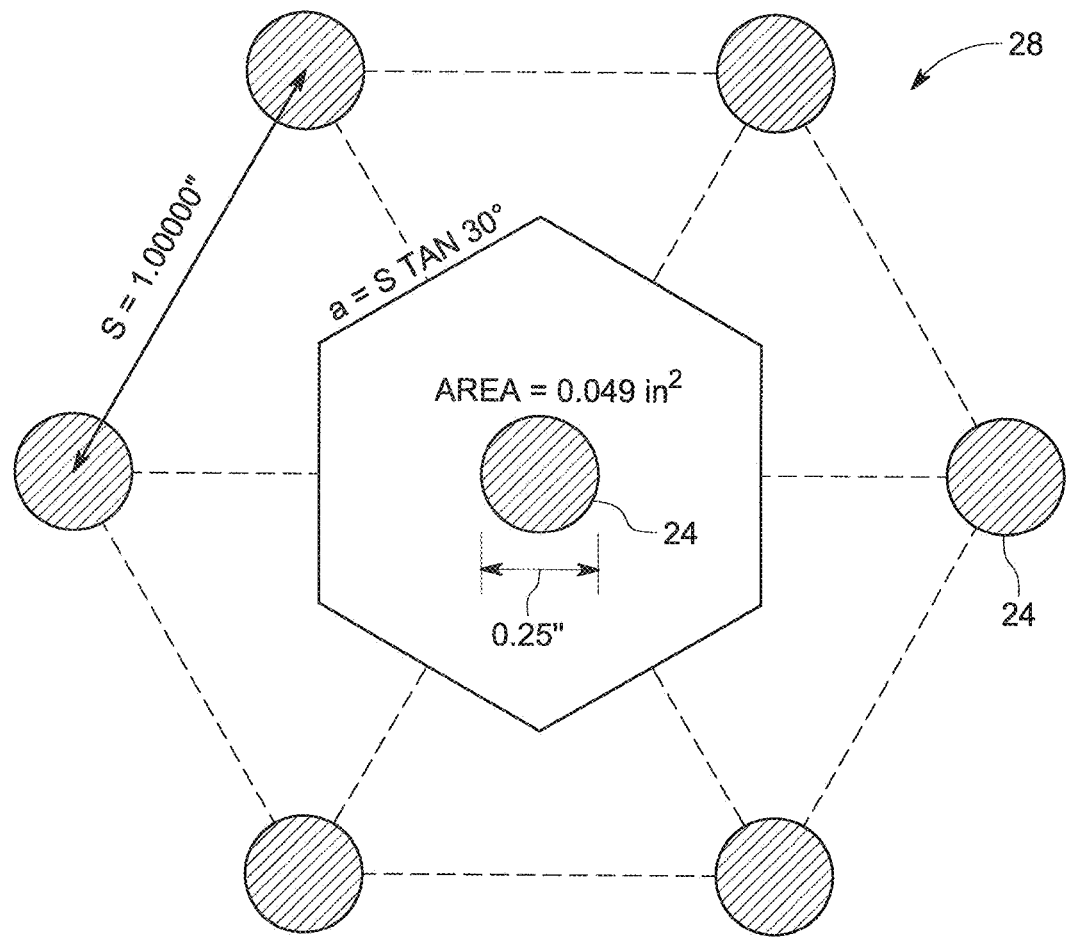
FIG. 4 is a schematic drawing illustrating internal support posts in a selected geometrical array.

Still referring to the example, an exemplary geometry for the hexagonal array 28 of internal support posts 24 is illustrated in FIG. 4. The hexagonal array 28 includes seven internal support posts 24, six of which are at the corners of the hexagon and one in the center of the hexagon. The radius of curvature R of the saddle features 38S and the dome features 38D are design variables set by the selection of the pattern and spacing of the hexagonal array 28. In this example, the hexagonal array 28 has a 1 inch spacing S between the internal support posts 24 and a wall thickness t for the planar top side 20T of 0.035 inch. The approximate radius R at the peak of each dome 42D (FIG. 3B) is 1.1 inch. Modelling each dome 42D (FIG. 3B) as a sphere, at P=1 k psi operating pressure, the dome stress is: $\sigma_{dome}$=(1 k×1.10)/(2×0.035)≅16 k psi. The approximate radius R at the saddle point 40S (FIG. 3A) is 0.70 inch. Modelling each saddle feature 38S as a cylinder, at P=1 k psi operating pressure, the saddle stress is: $\sigma_{saddle}$=(1 k×0.70)/(0.035)≅20 k psi.

Each internal support post 24 is stressed by pressure acting on the surrounding surface area. FIG. 4 shows that the amount of area that is supported by each post is 0.866 in². In addition, each internal support post 24 has a 0.25 inch diameter D with a cross-sectional area of 0.049 in². At P=1 k psi the stress on each internal support post 24 is: $\sigma_{post}$=pressure×(surface area−post area)/post area≅17 k psi and $\sigma_{post}$=1000×(0.866−0.049)/0.049≅17 k psi.

There is a joint 22SP (FIG. 2) where each internal support post 24 joins the planar top side 20T and the planar bottom side 20B. The shear stress on these joints 22SP is significant. Preferred joint designs include welding or brazing. The designer must evaluate the shear stress on these joints 22SP and confirm adequate strength.

Figure 5A:
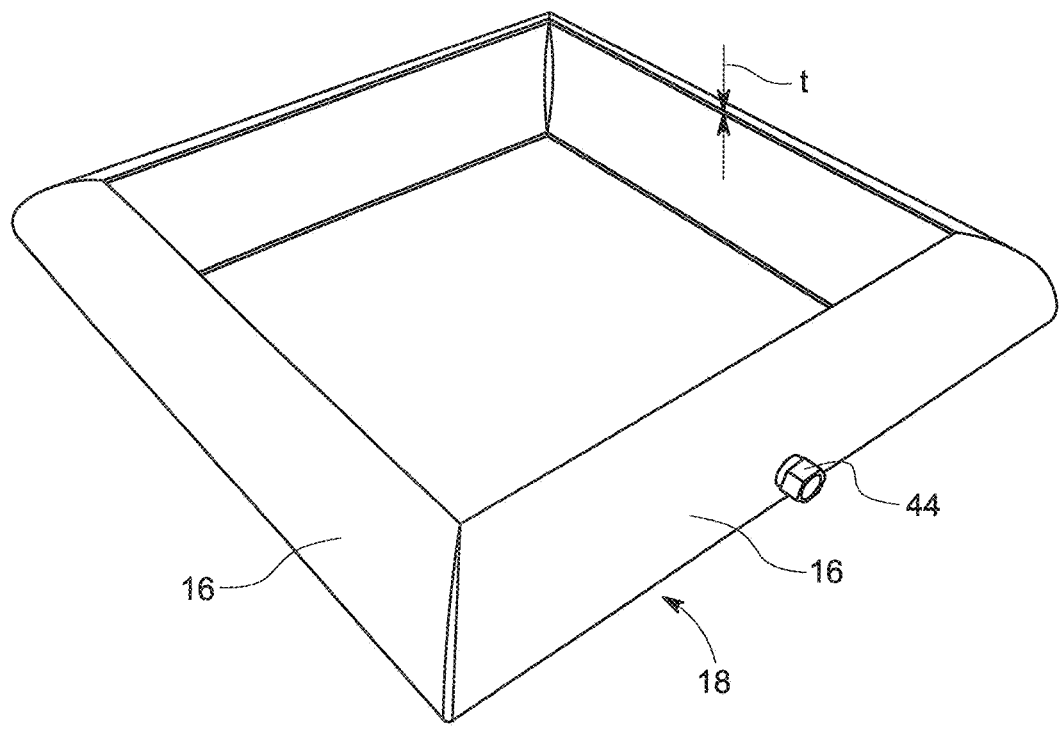
FIG. 5A is a perspective drawing illustrating a frame forming step in a method for fabricating the pressure vessel.

Method of Fabrication. An exemplary method of fabrication for the pressure vessel 14 is illustrated in FIGS. 5A-5D. FIG. 5A illustrates the step of forming the frame 18 by welding or brazing the curved sidewalls 16 using conventional techniques. In this example, the frame comprises 321 SS and has a 12"×12" square outline. The sidewalls 16 comprise half tubes having a 2.5" diameter D. In addition, a fitting 44 is attached to at least one of the sidewalls 16 as an inlet/outlet for the pressure vessel 14. The curved sidewalls 16 can have a thickness t of 0.063" for a 1000 psi rated stainless steel prototype. This parameter can be engineered according to the pressure requirements of the pressure vessel 14.

Figure 5B:
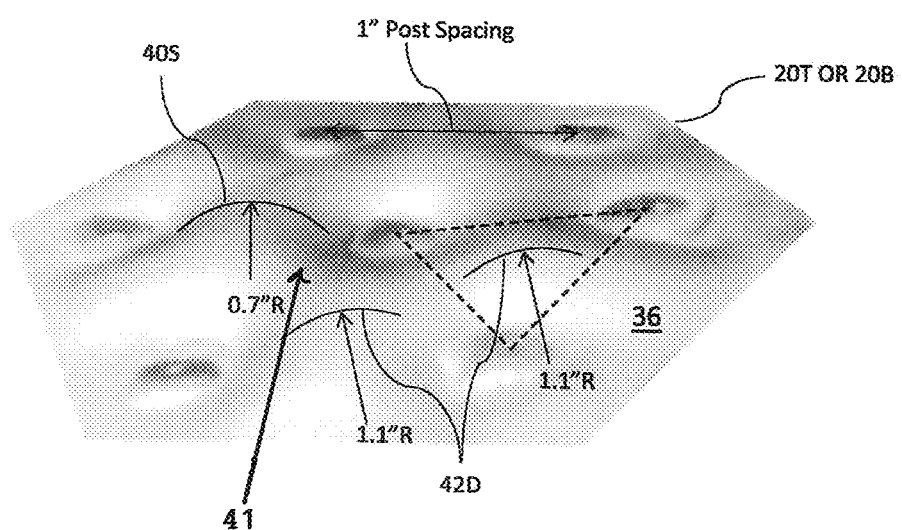
FIG. 5B is a photograph illustrating the complex shaped pressure resistant features forming step in the method for fabricating the pressure vessel.

FIG. 5B illustrates the step of forming the planar top side 20T and the planar bottom side 20B with contoured surfaces 36 having the shaped pressure resistant features 38. The preferred method for forming the contoured planar surfaces 36 and the shaped pressure resistant features 38 is by hydraulic pressurization (or hydroforming) of the originally flat surfaces by in situ hydraulic pressurization of the assembled pressure vessel 14. For example, the hydraulic pressurization can be performed along with a high pressure hydraulic fluid generated by a hydraulic pump. The hydraulic fluid causes the metal to expand. Alternately rather than being performed in situ on the assembled pressure vessel, the forming step can be accomplished using flat metal plates in the desired shapes of the planar top side 20T and the planar bottom side 2013, prior to assembly of the pressure vessel 14. In either case, the resulting distortion, using geological terms, forms the dome features 38S 38D (FIG. 3A) and the saddle features 38S (FIG. 313) in the areas between internal support posts 24 with transitions 41 therebetween. The resulting short radius curved surfaces reduce hoop stress in the surface material of the contoured surface 36. Plastic strain in forming the contoured surface 36 and the shaped pressure resistant features 38 also induces prestress or "autofrettage". The complex shapes of the contoured surface 36 and the shaped pressure resistant features 38 are naturally resistant to the internal pressure by which they were formed. As will be further explained, hydraulic inflation can also be used as controllable means of tensioning reinforcing fibers of composite pressure vessels before curing of a resin. Lastly, the dome features 38D and the saddle features 38S can have a pattern, such as a hexagonal array, that corresponds to the pattern of the internal support posts 24.

Figure 5C:
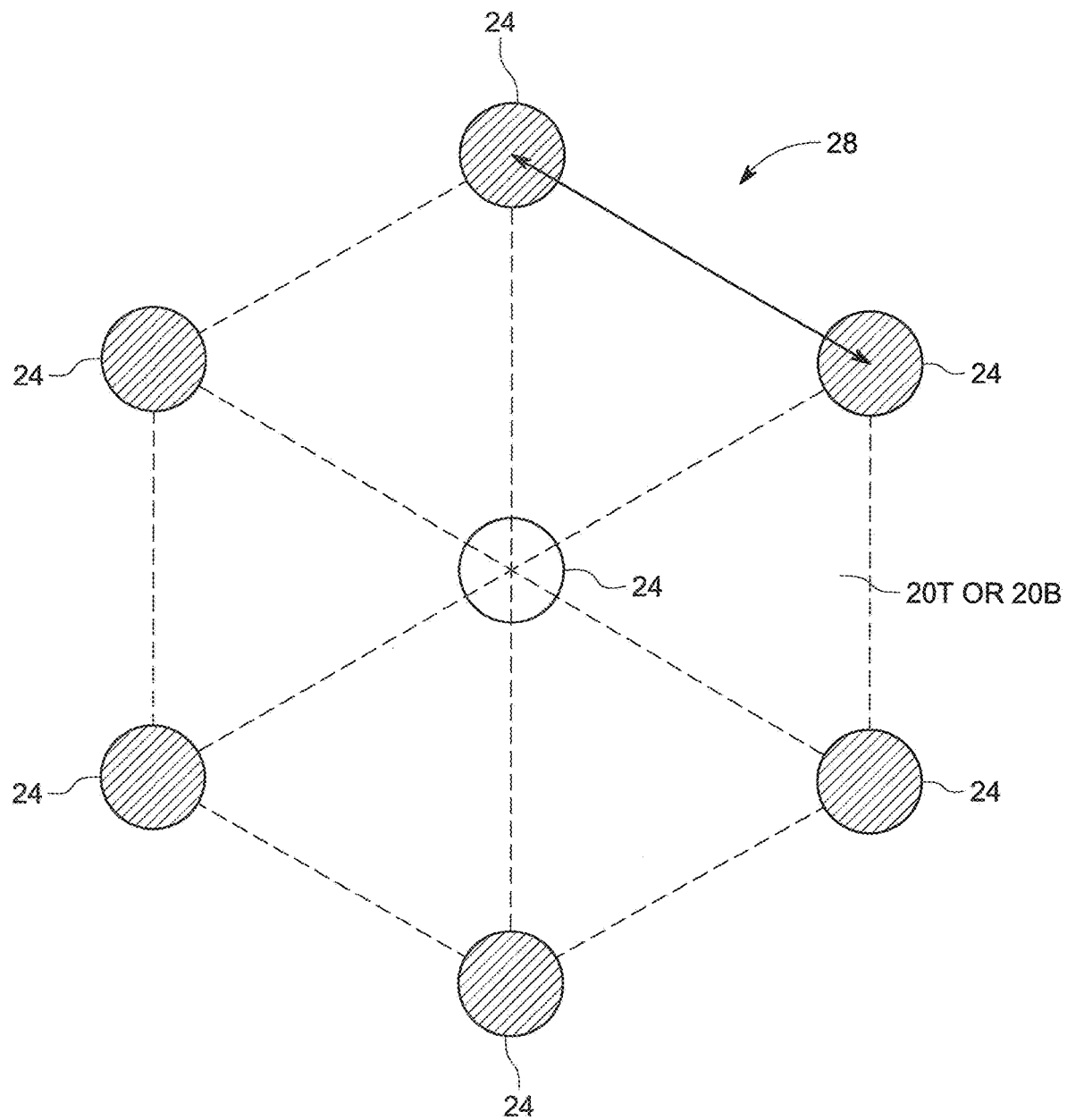
FIG. 5C is a schematic drawing illustrating an internal post forming step in the method for fabricating the pressure vessel.

FIG. 5C illustrates the step of forming the hexagonal array 28 of internal support posts 24 on the planar top side 20T and the planar bottom side 20B. This step can be performed by forming the welded or brazed joints 22SP (FIG. 2) using conventional welding or brazing techniques.

Figure 5D:
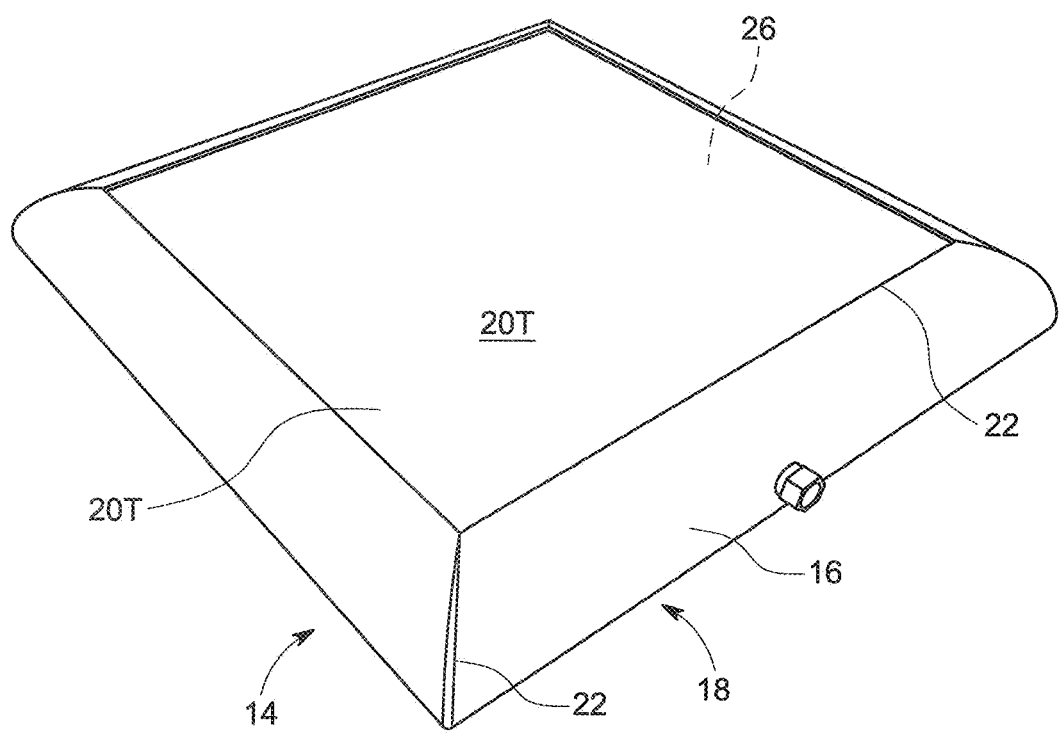
FIG. 5D is a schematic drawing illustrating an attaching of the planar sides to the frame step in the method for fabricating the pressure vessel.

FIG. 5D illustrates the step of attaching the planar top side 20T and the planar bottom side 20B to the frame 18 to form the sealed pressure chamber 26. This step can also be performed using conventional welding or brazing techniques. As previously explained, the contoured surfaces 36 and the shaped pressure resistant features 38 can be formed after the planar top side 20T and the planar bottom side 20B have been welded to the frame 16 using hydraulic pressurization by applying a pressure to the sealed pressure chamber 26 that is much higher than an intended service pressure of the pressure vessel 10 to induce plastic strain.

Figure 6:
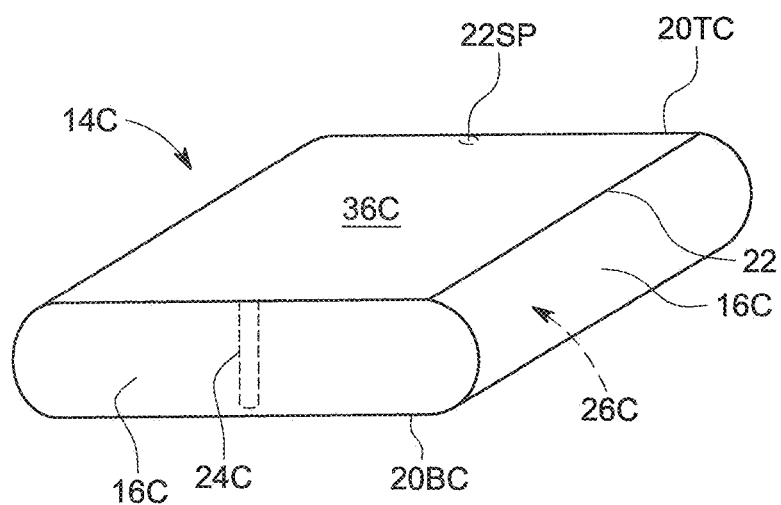
FIG. 6 is a perspective drawing of a composite pressure vessel.

Referring to FIG. 6, a composite pressure vessel 14C is illustrated. The composite pressure vessel 14C uses the pressure vessel 14 as a metal liner reinforced with carbon fiber, glass fiber, fiber/epoxy tape and cured fiber/epoxy materials. The composite pressure vessel 14C includes wrapped sidewalls 16C and reinforced tubular internal support posts 24C. The composite pressure vessel 14C also includes planar top side 20TC and planar bottom side 20BC having reinforced contoured surfaces 36C. The composite pressure vessel 14C can have an increase of service pressure of about 10× over the pressure vessel 14 (FIG. 2). An exemplary increase of service pressure can be from 1 ksi to 10 ksi. Light gases, especially hydrogen, permeate at significant rates through many polymeric pressure vessel materials, including polyethylene and epoxy. To avoid this problem, the impermeable internal pressure vessel 14 can be wrapped with high strength composite materials providing external support for the composite pressure vessel 14C.

Figure 7:
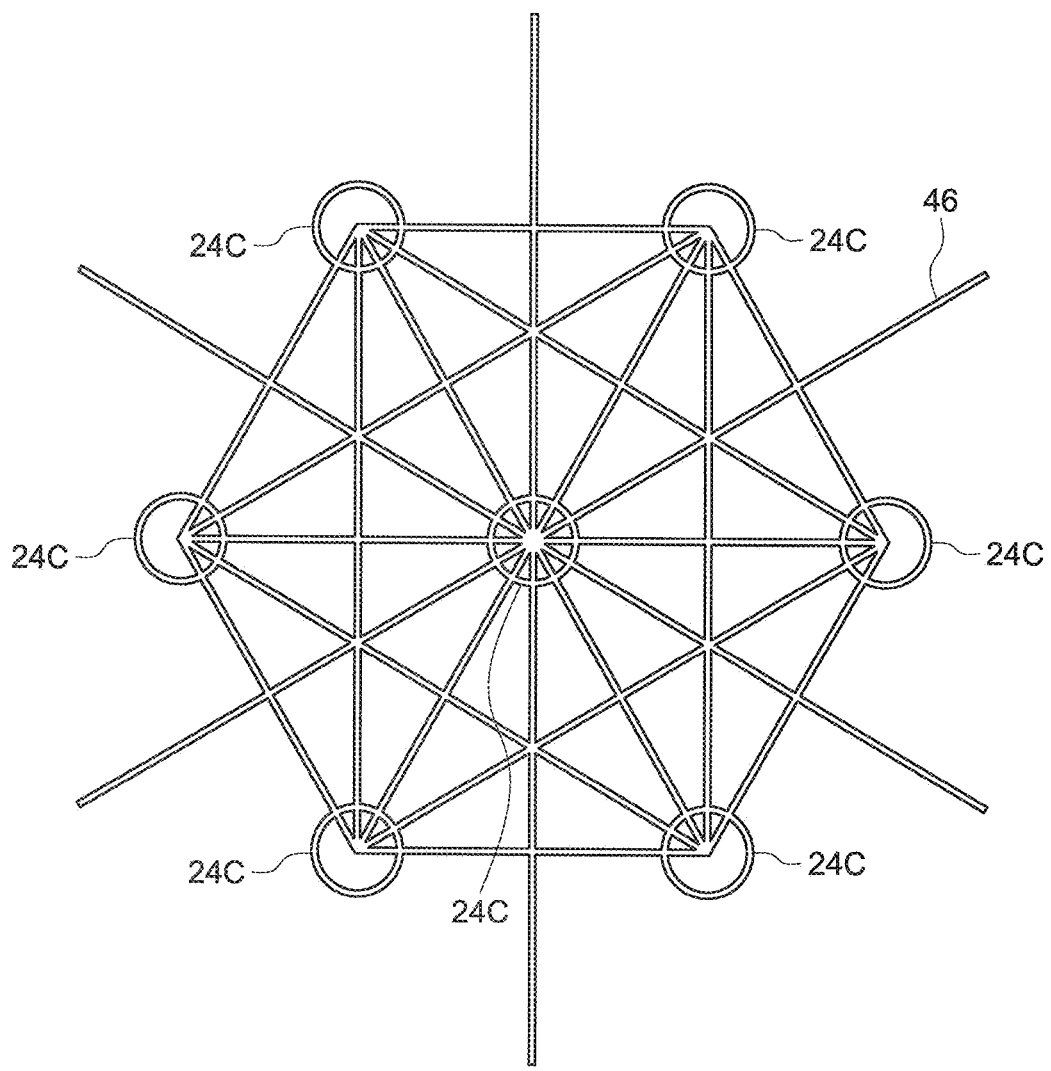
FIG. 7 is a schematic drawing illustrating the fabrication of reinforced internal support posts of the composite pressure vessel with radial symmetrical wrapping of contoured surfaces.

Referring to FIG. 7, reinforcing of the composite internal support posts 24C and the contoured surfaces 36C for the composite pressure vessel 14C using carbon fiber 46 is illustrated. In this example, 12 strands of the carbon fiber 46 pass through each composite internal support posts 24C per layer of wrap (e.g. 24 for 2 layers etc.) along with additional strands of carbon fiber 46A (see FIG. 8) for axial and radial reinforcement. The composite internal support posts 24C also provide sealed passages between two or more pressure vessel surfaces through which the carbon fiber 46 can be passed without concern for gas permeation. As will be further explained, rather than using carbon fiber 46 for reinforcing, a glass fiber, or a fiber/epoxy tape can be employed. In addition, the hydraulic forming of the contoured surfaces 36C after reinforcing provides a mechanism for tensioning the carbon fibers 46. In addition, the carbon fibers 46 can be coated with a binder, such as epoxy, that can be cured following tensioning.

Figure 8:
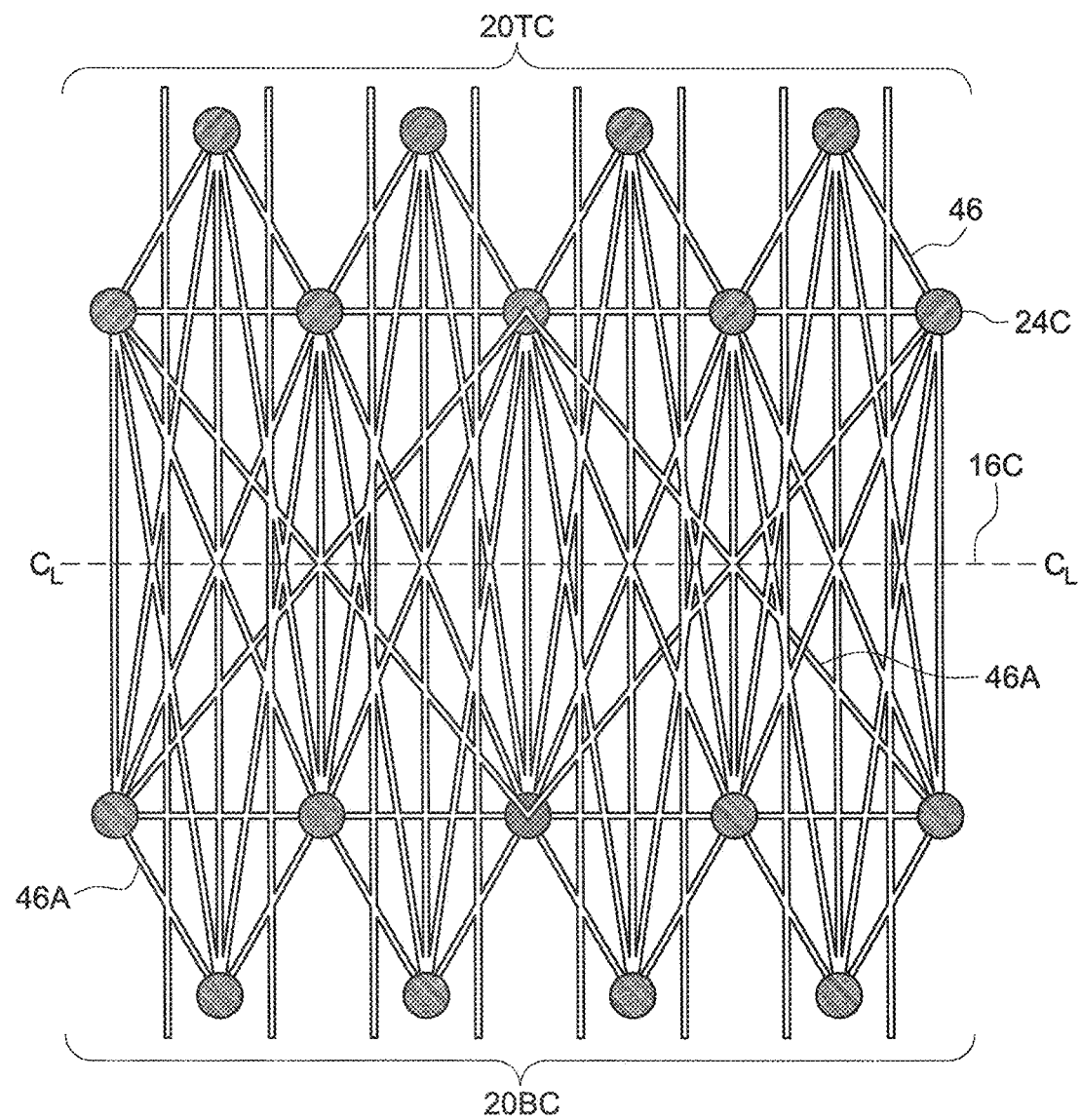
FIG. 8 is a schematic drawing illustrating the fabrication of reinforced curved sidewalls of the composite pressure vessel.

Referring to FIG. 8, reinforcing of the sidewalls 16C using the carbon fiber 46 is illustrated. In this example, the sidewalls 16C are semicircular and have a tube centerline substantially as shown. In addition, the carbon fiber 46 includes strands for axial reinforcement and can pass through the composite internal support posts 24C and across the contoured surfaces 36C substantially as previously described.

Figure 9:
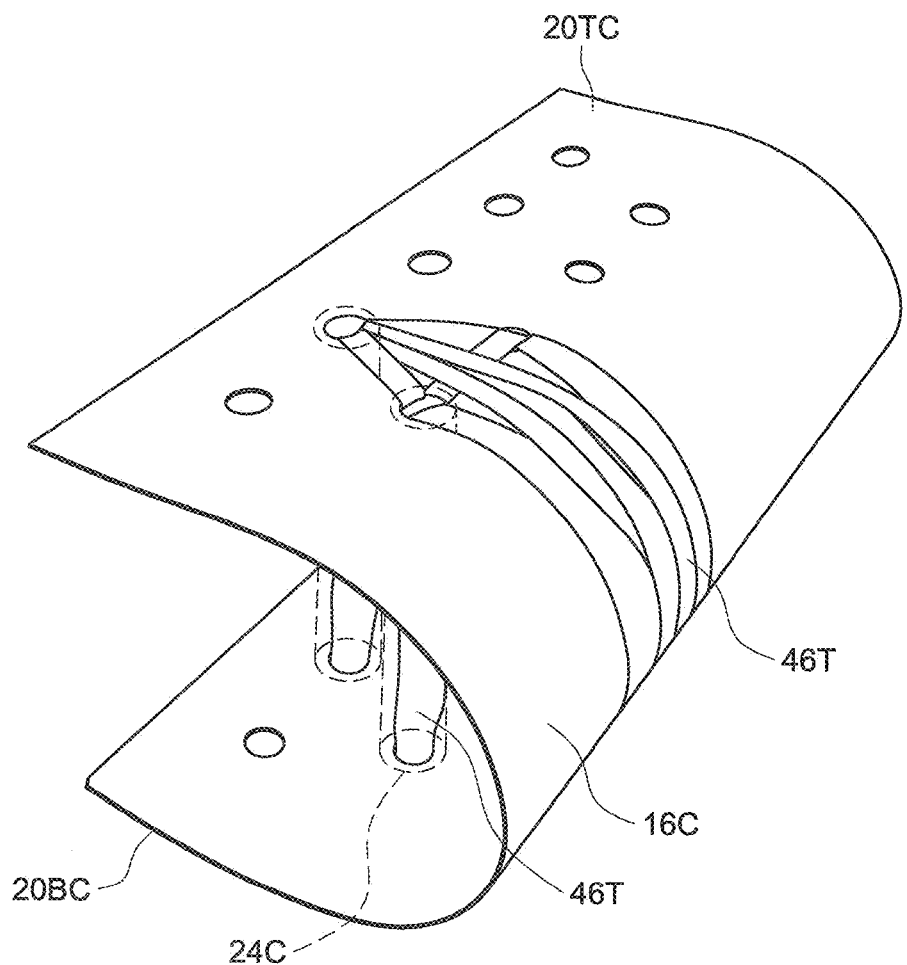
FIG. 9 is a perspective drawing illustrating the fabrication of reinforced internal support posts of the composite pressure vessel and wrapping of the reinforced sidewalls.

Referring to FIG. 9, reinforcing of the sidewalls 16C and the internal support posts 24C by wrapping with fiber/epoxy tape 46T is illustrated. Wrapping with one continuous ribbon of fiber/epoxy tape 46T lends itself to automation. In addition, multiple layers of fiber/epoxy tape 46T provide high strength reinforcement. Still further, wrapping with one continuous ribbon of fiber/epoxy tape 46T (or carbon fiber 46) permits both stressed planar and curved surfaces to be strengthened. In addition, the internal support posts 24C inside the composite pressure vessel 14C form sealed passageways for the ribbon of fiber/epoxy tape 46T. In this manner gas does not contact the fiber/epoxy tape 46T and there is no permeation.

Figure 10:
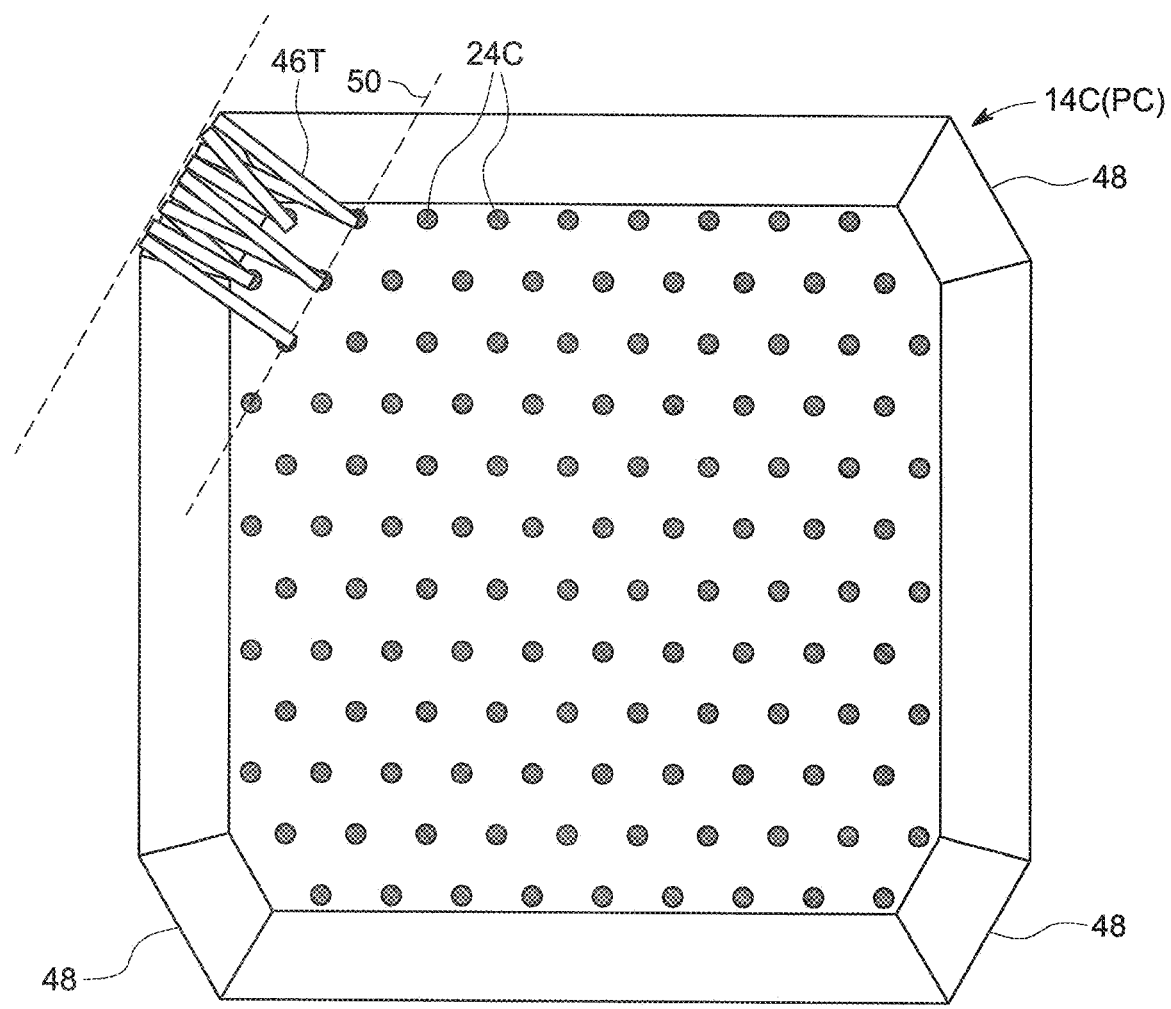
FIG. 10 is a schematic plan drawing of a composite pressure vessel having corners that are parallel to a row of tubular internal support posts in a hexagonal array to facilitate application of reinforcing materials.

Referring to FIG. 10, an alternate embodiment composite pressure vessel 14C(PC) is illustrated. The composite pressure vessel 14C(PC) has a polygonal outline that facilitates applying of the fiber/epoxy tape 46T. For example, corners 48 of the polygonal outline of the composite pressure vessel 14C(PC) can be parallel to a row 50 of composite internal support posts 24C of the hexagonal array 28 substantially as shown in FIG. 10.

Figure 11:
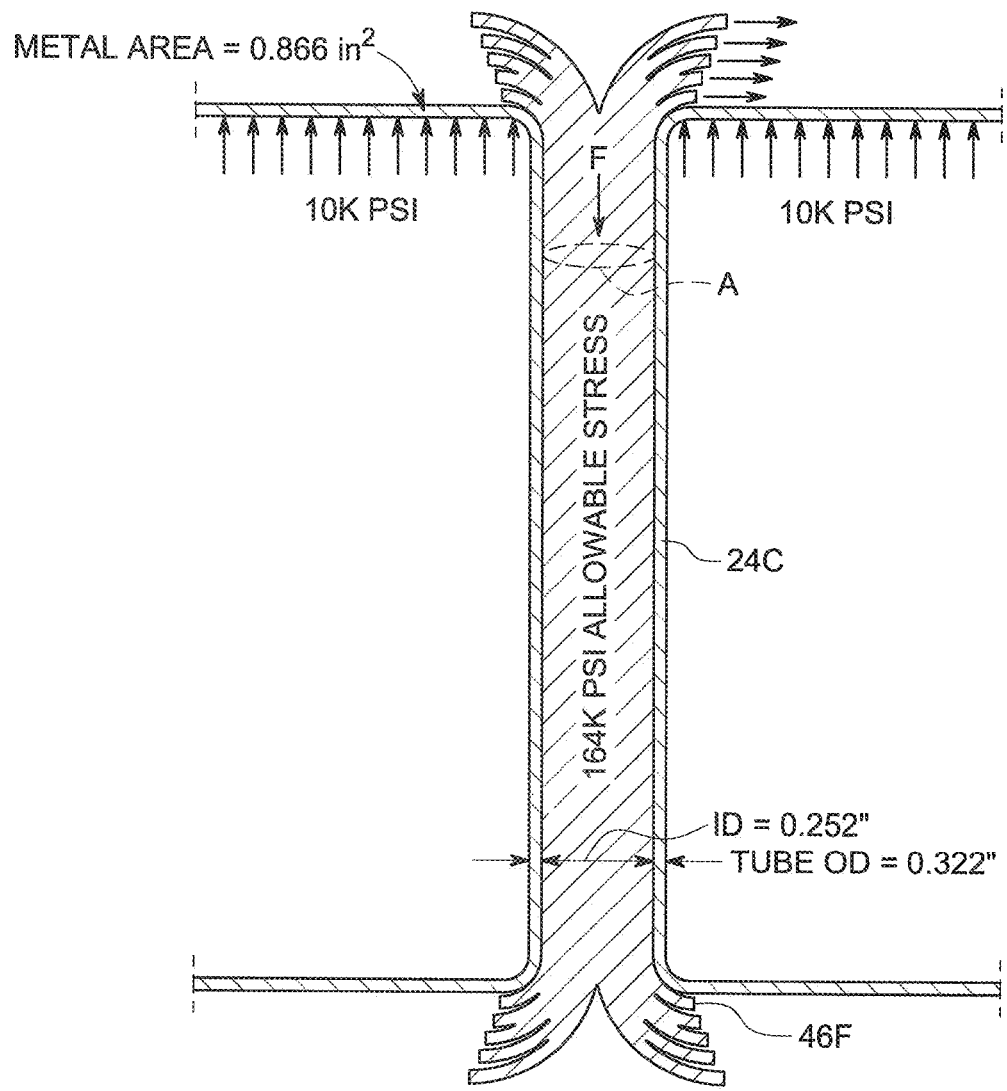
FIG. 11 is a schematic drawing illustrating a stress analysis of composite internal support posts having reinforcing material therein.

Referring to FIG. 11, a stress analysis of the composite internal support posts 24C of the hexagonal array 28 is illustrated. In FIG. 11, the composite internal support posts 24C comprise hollow metal tubes filled with a fiber reinforcing material 46F. In addition, the fiber reinforcing material 46F is also wrapped around the contoured surface and the sidewalls 16C as previously explained. In this analysis, a surrounding metal surface area equals 0.866 in², a tube internal area equals 0.0498 in², a fiber/epoxy allowable stress equals 164 k psi and the internal pressure equals 10 k psi.

In FIG. 11:
1" Hexagonal post array
10 k psi internal pressure
F=A×164 K psi=10 k psi×(0.866 in²−A)
A (1+10/164) in²=10/164 (0.866) in²
1.062 A in²=0.528 in²

A=0.0498 in²
Radius=0.126 in
ID=0.252 in
Tube Wall*=0.035
Tube OD*=0.322
164 k psi allowable stress*
  *Tensile strength=370 k psi
  *Safety factor=2.25
Tubes displace 9.4% of internal tank volume
*Neither the strength nor the unstressed area of the tube wall were included in this analysis. These are small errors in the interest of simplicity resulting in greater safety factor.

Figure 12:
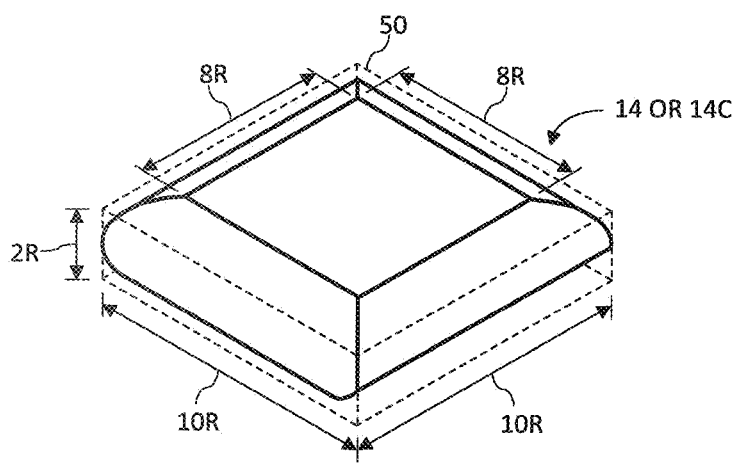
FIG. 12 is a perspective drawing of the pressure vessel (or the composite pressure vessel) illustrating dimensions for calculating the box space occupied by the pressure vessel.

Referring to FIG. 12 the rectilinear box volume 50 occupied by the pressure vessel 14 (or the composite pressure vessel 14C) can be calculated as follows:

$$\text{rectilinear box volume } 50 = 10R \times 10R \times 2R = 200R^3$$

$$\text{center section} = 8R \times 8R \times 2R = \quad 128.00R^3$$

$$4 \text{ sides} = 4 \times 0.5\pi R^2 \times 8R = 16\pi R^3 = \quad 50.27R^3$$

$$4 \text{ corners} = 4 \times \frac{4}{3}R^3 = \frac{16}{3}R^3 = \quad 5.33$$

$$\overline{183.60R^3}$$

$$\text{Space Utilization Efficiency} = 183.6/200 = 91.8\%$$

While a number of exemplary aspects and embodiments have been discussed above, those of skill in the art will recognize certain modifications, permutations, additions and subcombinations thereof. It is therefore intended that the following appended claims and claims hereafter introduced are interpreted to include all such modifications, permutations, additions and sub-combinations as are within their true spirit and scope.

What is claimed is:

1. A composite pressure vessel comprising:
   a plurality of curved sidewalls configured as a frame having a polygonal outline;
   at least two opposing sides including a top side and a bottom side attached to the curved sidewalls forming a sealed pressure chamber therebetween configured to contain a fluid or a gas at a pressure, at least one of the sides including a contoured surface comprising a plastically strained metal having a plurality of shaped features formed thereon configured to resist the pressure, the shaped features including dome features and saddle features formed in the contoured surface with transitions therebetween, each dome feature having a first cross section comprising a plurality of spaced domes with a first radius, each saddle feature having a second cross section comprising a saddle point with a second radius;
   a plurality of internal support posts within the sealed pressure chamber attached to the sides in a geometrical pattern, the internal support posts comprising hollow tubes reinforced with a reinforcing material passed through the internal support posts, and tensioned on and reinforcing the contoured surface; and
   a plurality of joints between the internal support posts and the sides configured to seal an interior of each internal support post from the sealed pressure chamber and to resist shear stresses and prevent leakage or permeation of the fluid or the gas from the sealed pressure chamber at the pressure and with the interior of each internal support post forming, a sealed passage.

2. The composite pressure vessel of claim 1 wherein the reinforcing material comprises carbon fibers, glass fibers, fiber/epoxy tape or cured fiber/epoxy materials.

3. A composite pressure vessel comprising:

a plurality of curved sidewalls configured as a frame having a polygonal outline;

at least two opposing sides including a top side and a bottom side attached to the curved sidewalls forming a sealed pressure chamber therebetween configured to contain a fluid or a gas at a pressure, at least one of the sides including a contoured surface comprising a prestressed metal having a plurality of shaped features formed thereon configured to resist the pressure, the shaped features including dome features and saddle features formed in the contoured surface with transitions therebetween, each dome feature having a first cross section comprising a plurality of spaced domes with a first radius, each saddle feature having a second cross section comprising a saddle point with a second radius;

a plurality of internal support posts within the sealed pressure chamber attached to the sides in a geometrical pattern, the internal support posts comprising hollow tubes reinforced with a prestressed reinforcing material passed through the internal support posts and covering the contoured surface and the curved sidewalls; and a plurality of joints between the internal support posts and the sides configured to seal an interior of each internal support post from the sealed pressure chamber and to resist shear stresses and prevent leakage or permeation of the fluid or the gas from the sealed pressure chamber at the pressure and with the interior of each internal support post forming a sealed passage.

4. The composite pressure vessel of claim 3 wherein the sides are parallel to one another and the internal support posts are perpendicular to the sides.

5. The composite pressure vessel of claim 3 wherein the polygonal outline comprises a rectangle.

6. The composite pressure vessel of claim 3 wherein the curved sidewalls and the sides are configured as a metal liner for the reinforcing material.

* * * * *